US011531690B1

(12) United States Patent
Bates et al.

(10) Patent No.: US 11,531,690 B1
(45) Date of Patent: Dec. 20, 2022

(54) GEOSPATIAL VISUALIZATION AND QUERY TOOL

(71) Applicant: NATIONWIDE MUTUAL INSURANCE COMPANY, Columbus, OH (US)

(72) Inventors: Zachary Bates, Columbus, OH (US); Kyle Biddinger, Columbus, OH (US); Tom R. Elston, Columbus, OH (US)

(73) Assignee: Nationwide Mutual Insurance Co., Columbus, OH (US)

( * ) Notice: Subject to any disclaimer, the term of this patent is extended or adjusted under 35 U.S.C. 154(b) by 0 days.

(21) Appl. No.: 17/459,568

(22) Filed: Aug. 27, 2021

Related U.S. Application Data

(63) Continuation of application No. 16/599,301, filed on Oct. 11, 2019, now Pat. No. 11,106,706.

(51) Int. Cl.
*G06F 16/29* (2019.01)
*G06F 16/248* (2019.01)
*G06F 16/2457* (2019.01)
*G06F 3/0482* (2013.01)
*G06F 3/04847* (2022.01)

(52) U.S. Cl.
CPC ............ *G06F 16/29* (2019.01); *G06F 16/248* (2019.01); *G06F 16/24578* (2019.01); *G06F 3/0482* (2013.01); *G06F 3/04847* (2013.01)

(58) Field of Classification Search
CPC .. G06F 16/29; G06F 16/248; G06F 16/24578; G06F 3/0482; G06F 3/04847
See application file for complete search history.

(56) References Cited

U.S. PATENT DOCUMENTS

| | | | |
|---|---|---|---|
| 9,436,949 B1* | 9/2016 | Samin | G06Q 40/06 |
| 10,275,140 B1* | 4/2019 | Miller | G06F 3/04817 |
| 2006/0100912 A1* | 5/2006 | Kumar | G06F 16/951 |
| | | | 705/4 |
| 2007/0168370 A1* | 7/2007 | Hardy | G06F 16/29 |
| 2007/0214023 A1* | 9/2007 | Mathai | G01W 1/00 |
| | | | 705/4 |
| 2008/0077642 A1* | 3/2008 | Carbone | G06F 16/9537 |
| | | | 707/999.005 |
| 2012/0265633 A1* | 10/2012 | Wohlstadter | G06Q 40/00 |
| | | | 709/206 |

(Continued)

*Primary Examiner* — Asher D Kells
(74) *Attorney, Agent, or Firm* — Thomas E. Lees, LLC

(57) ABSTRACT

A geospatial query and navigation process generates a first filtered result comprising assets that satisfy a user generated query, where each asset includes a geospatial location and an exposure rank that estimates a risk associated with the asset based at least in part, upon a policy limit of a policy associated with the asset. The process also generates a current view of a geographical map, and positions indicia on the current view of the geographical map representing assets within the first filtered result according to their geospatial location that are also located within the current view of the geographical map and that also satisfy a predefined exposure rank requirement. The process modifies the current view of the geographical map to alter displayed geographical boundaries responsive to a user entered selection, whereupon the displayed indicia representing assets is updated according to the modified view of the geographical map.

19 Claims, 10 Drawing Sheets

(56) References Cited

U.S. PATENT DOCUMENTS

| | | | |
|---|---|---|---|
| 2014/0172465 A1* | 6/2014 | Yoder | G06Q 40/08 |
| | | | 705/4 |
| 2015/0074097 A1* | 3/2015 | Lavine | G06F 16/2468 |
| | | | 707/780 |
| 2017/0052747 A1* | 2/2017 | Cervelli | G06T 11/001 |
| 2017/0161859 A1* | 6/2017 | Baumgartner | G06Q 50/26 |
| 2019/0361927 A1* | 11/2019 | Hampton | G06F 16/732 |
| 2019/0370894 A1* | 12/2019 | Meyers | G06Q 40/025 |
| 2019/0378216 A1* | 12/2019 | Fiete | G06Q 40/08 |
| 2020/0019285 A1* | 1/2020 | Leahy, Jr. | G09B 29/003 |
| 2021/0035226 A1* | 2/2021 | Dybvik | G06Q 40/08 |

\* cited by examiner

GEOSPATIAL VISUALIZATION AND QUERY TOOL

CROSS REFERENCE TO RELATED APPLICATIONS

This application is a continuation of U.S. patent application Ser. No. 16/599,301, filed Oct. 11, 2019, now allowed, entitled GEOSPATIAL VISUALIZATION AND QUERY TOOL', the disclosure of which is hereby incorporated herein by reference.

BACKGROUND

Various aspects of the present disclosure relate generally to a query tool, and more particularly to a query tool that enables datasets to be linked with geospatial data and/or geospatially linked image data such that generated query results are navigable in multiple views.

Physical assets, including property, buildings, and other structures are often insured as a form of protection against damage, disruption, and other unanticipated events. However, selecting an amount of insurance that is expected to be commensurate with damage caused by a future event can be difficult and imprecise. Moreover, changes in facts, changes in asset condition, changes in tolerance of assumption of risk, inaccurate predictions of a likelihood of a future adverse event, and other factors can result in a need to re-evaluate the suitability of insurance coverage from time to time.

BRIEF SUMMARY

According to aspects of the present disclosure, a process is provided for visualizing and querying assets. The process comprises generating, responsive to receiving a user generated query to search a set of assets, a first filtered result. The first filtered result includes assets within the set of assets that satisfy the user generated query, where each asset is associated with asset data including a geospatial location and an exposure rank that estimates a risk associated with the asset based at least in part, upon a policy limit of a policy associated with the asset. The process also comprises generating electronic information for display on a computer display screen responsive to a user navigating a graphical user interface to enter a map view. The electronic information is generated by generating data representing a current view of a geographical map for display on the computer display screen, and positioning indicia on the current view of the geographical map representing assets within the first filtered result according to their geospatial location that are also located within the current view of the geographical map and that also satisfy a predefined exposure rank requirement. The process is further configured to iteratively perform, responsive to receiving user navigation commands, modifying the current view of the geographical map to alter displayed geographical boundaries responsive to a user entered selection, whereupon the displayed indicia representing assets is updated according to the modified view of the geographical map, and whereupon the data view is updated to include asset data of assets geographically located within the modified view of the geographical map.

According to further aspects of the present disclosure, a process for visualizing and querying assets is provided. The process comprises generating for output to a computer display screen, a graphical user interface having a filters view and a map view. The filters view comprises a visual representation of a set of filters, and the map view comprises a visual representation of a geospatially bounded region as a map. The process also comprises receiving via the filters view of the graphical user interface, a user entry defining a modified filter value for an attribute of interest within the set of global filters, and executing a query against a set of assets based upon the user entry to generate a first filtered result of assets, where each asset is associated with a geospatial location and a policy. The process further comprises generating, for each asset of the first filtered result of assets, an exposure rank that estimates a risk associated with the asset based at least in part, upon a policy limit of the policy associated with the asset. The process still further comprises generating electronic information for display in the map view by positioning a current view of a geographical map on the computer display screen and positioning indicia on the current view of the geographical map representing assets within the first filtered result according to their geospatial location that are also located within the current view of the geographical map and that also satisfy a predefined exposure rank requirement.

According to still further aspects of the present disclosure, a process for visualizing and querying assets is provided. The process comprises assigning an exposure rank to each asset is a set of assets, where each assigned exposure rank estimates a likelihood that a value associated with the corresponding asset deviates from an expected value, and each asset in the set of assets is associated with a corresponding geospatial location. The process also comprises generating for output to a computer display screen, a current view of a geospatially bounded region as a user-navigable geographical map. Yet further, the process comprises performing in an iterative manner, a set of operations. The set of operations includes positioning indicia on the current view of the geographical map representing assets within the set of assets according to their geospatial location that are also located within the current view of the geographical map and that also satisfy a user-established exposure rank condition, and providing an input that allows a user to change the current view by changing the geospatially bounded region of the geographical map.

DETAILED DESCRIPTION

Figure 1:
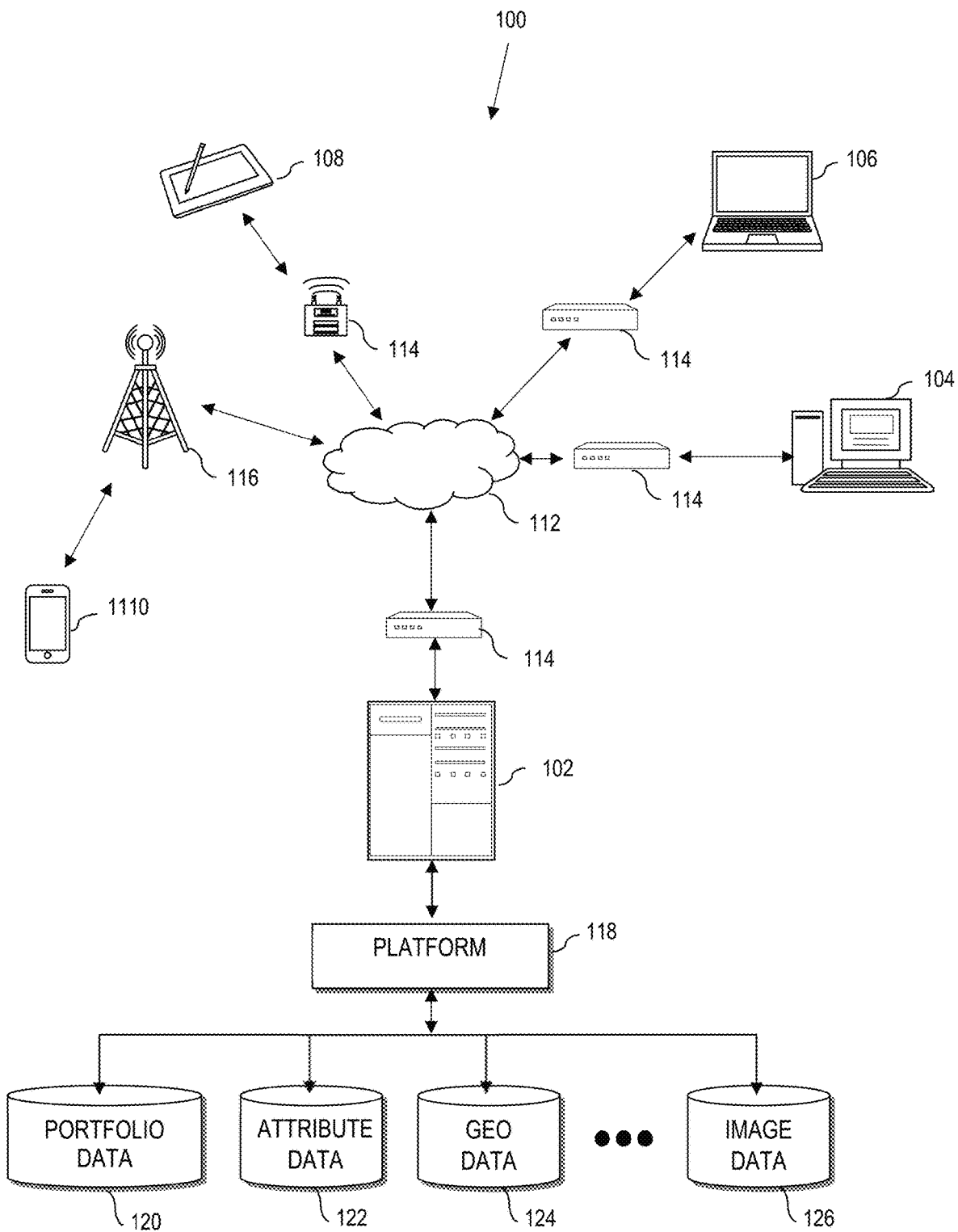
FIG. 1 is a schematic diagram of an example computer system in which aspects of the present disclosure can be implemented.

Large datasets raise ever increasing burdens for purposes of ensuring data verification, data validation, and data integrity. For some applications, it is possible to retrospect data, e.g., using a regimen of quality metrics, which can screen data for values that are missing, for data values that are clearly in error, etc. However, some large datasets include data fields that are populated with data values that fall within valid limits, but for which a value represents a non-ideal value for a related context, application, and/or event. Moreover, it may be difficult or impossible to accurately assess the appropriateness of a data value solely based upon objective, automated analysis of data in a dataset. Rather, some subjective assessment may be required or desired to determine whether a data value is appropriate, especially in a context where a data value is linked by a direct, indirect, tangible, or otherwise intangible relationship to a physical asset.

Thus, for instance, a conventional approach to evaluating insurance coverage suitability (e.g., for a property) can comprise a manual review of an associated policy, which may or may not prompt an investigation or inspection into the condition of a property. However, this process is time consuming, inefficient, may not reveal appropriate metrics because the focus of the analysis is on an individual policy basis.

However, aspects herein address the above-problem and provide an unconventional solution thereto by providing a portfolio query tool that enables datasets to be linked with geospatial data, and geospatially linked image data, such that generated query results are navigable in multiple views (e.g., a filters view, a map view, a data view, a combination thereof, etc.) by a user through a graphical user interface. By allowing a user to set custom query parameters, a large dataset (e.g., a managed portfolio of assets) can be viewed and navigated, allowing the user to apply a context-driven, subjective assessment of the suitability of stored data values in geographically defined bounds.

Accordingly, the disclosure herein improves the relevant technology of large dataset storage and analysis. Such improvements are brought about by providing a unique set of tools that link data to geospatial information so that queries can be run against the dataset. Moreover, query responses can be visualized in a map view that overlays indicia associated with the data onto a geographical map presented in the map view.

Moreover, some datasets are extremely large, containing too many records to subjectively assess each record for verification and/or validation of record contents. However, aspects herein address the above problem by providing a ranking algorithm that applies an objective ranking. For instance, the ranking may be based upon a computed likelihood of a value deviating from an expected, desired, or otherwise appropriate value. This ranking can be integrated into queries run by the query tool to expedite data verification and validation by indicating (e.g., visually, geospatial visually, etc.) those records in the data set most likely in need of verification and/or validation.

In an example application, a portfolio dataset stores massive amounts of data directed to assets, such as buildings, property, etc., that have a fixed geospatial position, and where the assets are distributed across a vast geographical area, e.g., across a city, county, state, or across multiple states, e.g., covering the United States or a portion thereof. Here, the context-driven subjective assessment uses geospatial data (e.g., location of a building or property, information regarding proximate similar buildings or properties, etc.), and geospatially linked image data (e.g., image data representing a current and/or recent state of the building or property) to corroborate the subjective assessment. To facilitate navigation through the extremely large dataset, one or more algorithms can generate a ranking of assets based upon objective-computer driven computations. By viewing and analyzing the image data in the context of algorithm generated ranking, subjective assessments can be generated. Thus, data integrity, verification, and validation are enabled. Here, the geospatial navigation provides a speed of processing and new and unique views of the data that were not otherwise possible. Thus, tasks of querying and viewing of assets are linked into a dynamic and interactive user experience.

Because the above-problem is directly related to computers, data storage, data retrieval, and data management, the subject matter is inherently technical. Moreover, the solutions provided herein are technical solutions to these technical problems, which themselves bring about a technical result, as the solutions enable a combination of querying and navigation based upon geospatial distribution of assets, geospatially linked image data related to assets, and algorithmically generated ranking, which are all tightly correlated, thus enabling speed, efficiency, and an ordered approach to validation and verification of data, as described more fully herein.

Moreover, some applications of various embodiments of the present disclosure may find practical application in industries such as insurance, e.g., to query and view specific property exposures for underwriting evaluation, such as through quantitative and qualitative evaluation of large data sets. Thus, the present disclosure integrates various technologies into a practical application. For instance, a combination of elements include a non-standard and novel graphical user interface, the provision of information stored digitally in a portfolio dataset, and non-standard transformation of data into geospatial visualizations combined with layers of data including asset and policy data, enable the user to understand data, prioritize data, and identify key assets, in a manner that was previously not possible, and could not be reasonably accomplished without the computer-based implementation discussed herein. Moreover, the description of such computer technology is limited to the practical application of a portfolio geospatial and query tool. For instance, in the context of an insurance application, the geospatial query tool allows a user to query and view specific property exposures by evaluating policy information, and by viewing image data of a property at the same time. The tool can also rank properties using a ranking algorithm to automatically prioritize or otherwise visually identify properties that should be subjectively evaluated, based upon geospatial relationships between properties in a portfolio.

Example Environment

Referring now to the drawings and particularly to FIG. 1, a network system 100 is illustrated according to aspects of the present disclosure herein. Generally, a processing device designated as a first device 102 communicates with one or more remote processing devices. Solely for sake of illustration, example remote processing devices are schematically illustrated as a second device 104, a third device 106, a fourth device 108, and a fifth device 110, which are all capable of communicating across a network 112 with the first device 102. In practice, any number of remote processing devices can interact with the first device 102.

The first device 102 may comprise a server computer, mainframe computer, or other processing device that is capable of communicating over the network 112, e.g., by responding to data transfer requests, performing processing at the request of a client, and by interacting with other servers, such as third party servers, backend servers, file servers, etc., as will be described in greater detail herein.

The remote processing devices may each comprise any processing device that can communicate over the network 112, e.g., to request and/or receive data from the first device 102. For instance, a typical processing device can include a personal computer (e.g., schematically represented as the second device 104), a laptop notebook/netbook computer (e.g., schematically represented as the third device 106), a tablet computer (e.g., schematically represented as the fourth device 108), a smartphone (e.g., schematically represented as the fifth device 110), etc. Other examples of remote processing devices can include another server computer, a transactional system, purpose-driven appliance, special purpose computing device, etc. Regardless, each remote processing device runs code, such as a thin client via a web browser, to carry out functions in cooperation with the first device 102, as described more fully herein.

The network 112 provides communication links between the various processing devices, e.g., the first device 102, the second device 104, the third device 106, the fourth processing device 108, and the fifth processing device 110. Accordingly, the network 112 may be supported by routers, wireless routers, switches, hubs, firewalls, network interfaces, wired or wireless communication links and corresponding interconnections, etc. (collectively, "networking components 114"). The network 112 can also be linked to other networks, e.g., a cellular network via a cellular to IP bridge 116, which can comprise a cellular station and corresponding cellular conversion technologies, e.g., to convert between cellular and TCP/IP, etc.

Moreover, the network 112 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

According to aspects herein, the first device 102 executes a platform 118 that is used to carry out a geospatial query and navigation tool (alone or in combination with one or more remote processing devices) as described more fully herein. In this regard, the platform 118 has access to various forms of data, including a portfolio dataset 120, attribute data 122, geospatial data 124, image data 126, etc. In this regard, the platform 118 may access the various forms of data by storing the data locally, by accessing the data via a file server, cloud storage, network addressed storage (NAS), etc. In other examples, one or more data sources are accessed by querying remote sites, such as third-party servers that host relevant information.

The network system 100 is shown by way of illustration, and not by way of limitation, as a computing environment in which various aspects of the present disclosure may be practiced. Other configurations may alternatively be implemented. For instance, the platform 118 and data, including the portfolio dataset 120, attribute data 122, geospatial data 124, image data 126, etc., can be implemented entirely on a processing device, e.g., device 102, or based upon an interaction between a remote processing device and server.

Process for Querying and Viewing Assets

Figure 2A:
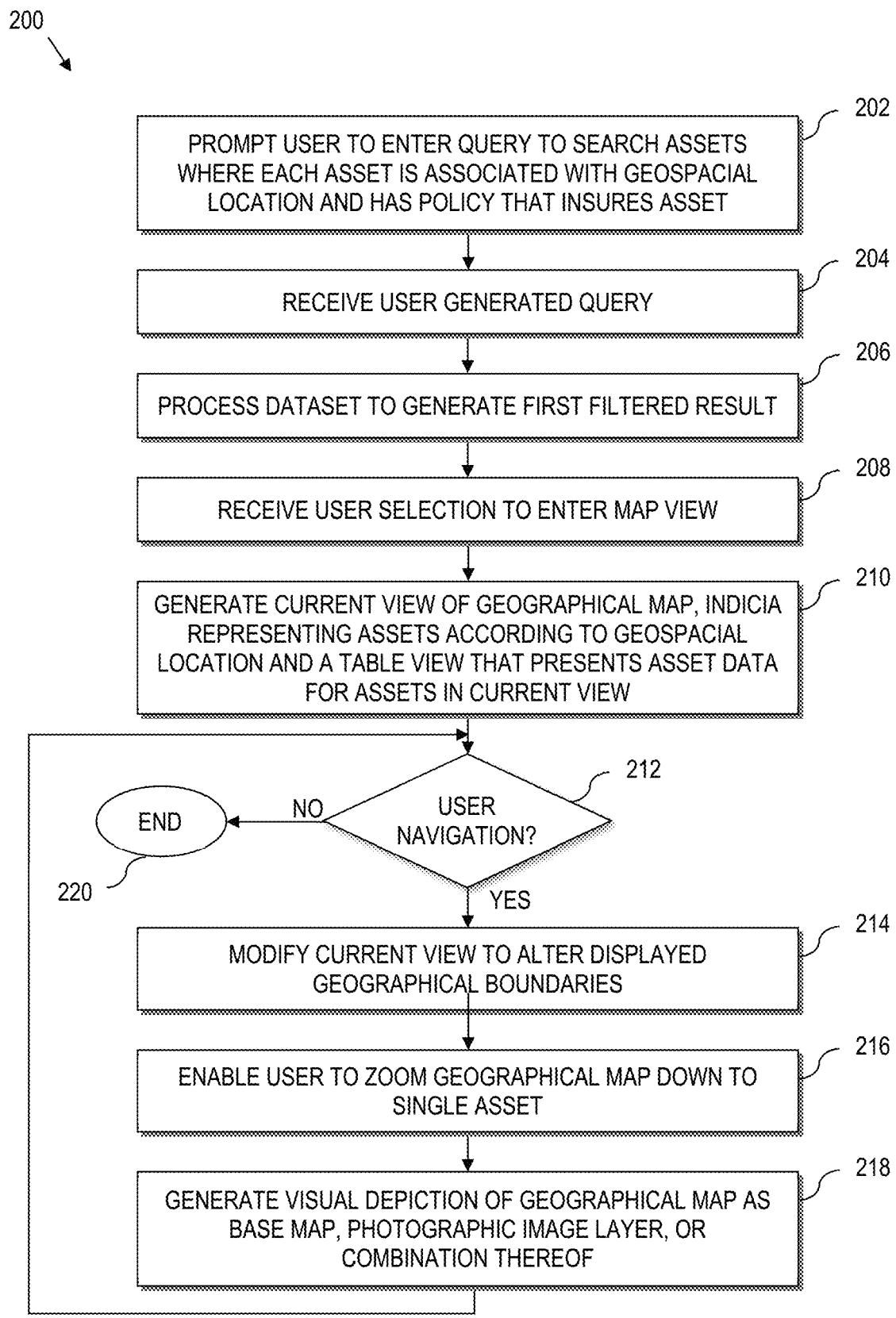
FIG. 2A is a flow chart illustrating a computer-implemented process for querying and viewing assets, according to aspects of the present disclosure.

Referring now to FIG. 2A, a computer-implemented process 200 is illustrated, for querying and viewing assets. With brief reference to FIG. 1, the process, or aspects thereof, can be implemented on the platform 118 of the first device 102, on a remote processing device (e.g., the second device 104, third device 106, fourth device 108, fifth device 110, etc.), or a combination thereof. For instance, a web browser operating on a remote processing device, can interact with the platform 118 to obtain web pages necessary to render the query and navigation capabilities, as described more fully herein. The process enables a user to query assets in a portfolio (e.g., a large dataset related to geospatially distributed assets, e.g., buildings, property, other fixed location assets, etc.), and navigate through assets in the portfolio geospatially, and via images. This allows a subjective assessment of data values for purposes of data verification, data validation, and other integrity purposes.

Referring back to FIG. 2A, process 200 for querying and viewing assets, comprises prompting at 202 a user, via a graphical user interface, to enter a query to search a portfolio dataset comprising assets, where each asset in the portfolio dataset is associated with a geospatial location and has a policy associated with the asset. For instance, the policy may insure a corresponding asset, such as a building, structure, etc. In some embodiments, the asset has a fixed geospatial location, e.g., a permanent structure such as a building.

As an example, the first device 104 (FIG. 1) can display a screen having a series of menu tabs. The user can navigate to and select a "filter view" menu option on a menu depicted on the computer screen. Upon entering the "filter view" tab menu option, the process can cause the graphical user interface to display on the computer screen, a visual representation of a set of global filters. Here, each filter in the set of global filters defines an attribute associated with assets in the portfolio dataset. Example attributes can include policy attributes, asset (e.g., location/building) attributes, event (e.g., catastrophe) attributes, etc. The process can thus provide defaults, drop down boxes, selection boxes, entry boxes, etc., to obtain the necessary global filters to construct a query. Accordingly, the user can interact with the attributes on the screen. Responsive thereto, the process can receive the user entry (or entries) modifying filter value(s) for at least one attribute of interest within the set of global filters. In some embodiments, the process may default all attributes. In this regard, the user selecting all the defaults is equivalent to the user entry modifying filter values, as the query is thus built using the defaults. Specific examples of attributes and user interactions are described in greater detail herein, with regard to FIG. 3 and FIG. 4.

The process 200 also comprises receiving at 204, responsive to the user interacting with the graphical user interface, the user generated query.

Additionally, the process 200 comprises processing at 206 the portfolio dataset. As a result, a first filtered result is generated, which comprises assets within the portfolio dataset that satisfy the user generated query.

The process 200 further comprises receiving at 208, a user selection to enter a map view on the computer screen.

Yet further, the process 200 comprises generating at 210 for display via the graphical user interface, responsive to the user selecting the map view, a current view of a geographical map. The current view also includes indicia representing assets within the first filtered result. The indicia represent assets whose real, physical location is within the map view depicted on the screen. The indicia are thus displayed on the map according to the geospatial location of assets that are also geographically located within the current view of the geographical map. Also, the displayed information includes a data view that presents asset data for assets that are displayed in the current view.

By way of example, the display screen can visually depict a map, e.g., a geographical map of the United States, or a portion thereof. Indicia is presented on the map representing assets that physically reside in the geography depicted area. Notably, in some embodiments, the number of assets may be too dense for the geographic region viewed. As such, there need not be a one-to-one correlation between the displayed indicia and assets in the query response. Moreover, the displayed information can take advantage of other visual cues. For instance, indicia can be color coded, e.g., based upon exposure rank (described in greater detail herein). Color coding provides a clear indication of where a user needs to navigate to identify attributes of interest, e.g., property exposures (such as underinsured property for underwriting evaluation). A table can be visually presented via the display to emphasize the indicia, e.g., by highlighting key attribute data regarding assets displayed within the current view of the geographical map.

The process enables a decision box at 212 to determine whether the user wants to navigate within the map view.

If the decision at 212 is to continue navigation in the map view (YES), the process 200 is further configured to perform an iterative loop. For instance, responsive to receiving a user navigation command, an action for modifying at 214 the current view of the geographical map to alter displayed geographical boundaries responsive to user entered selection. If the user changes the map view, the displayed indicia representing assets is updated according to the modified view of the geographical map. Also, the data view is updated to include asset data of assets geographically located within the modified view of the geographical map.

The iterative loop also comprises enabling at 216 the user to zoom the geographical map down to a single asset.

Additionally, the iterative loop comprises generating at 218 for each view, based upon user-selection, a visual depiction of the geographical map as a base map, a photographic image layer, or a combination thereof.

Referring back to the decision box at 212, if the user does not want to navigate (NO), the process ends. Upon ending for instance, the user can navigate to a new menu option, reset the query, etc.

Process for Visualizing and Querying Assets

Figure 2B:
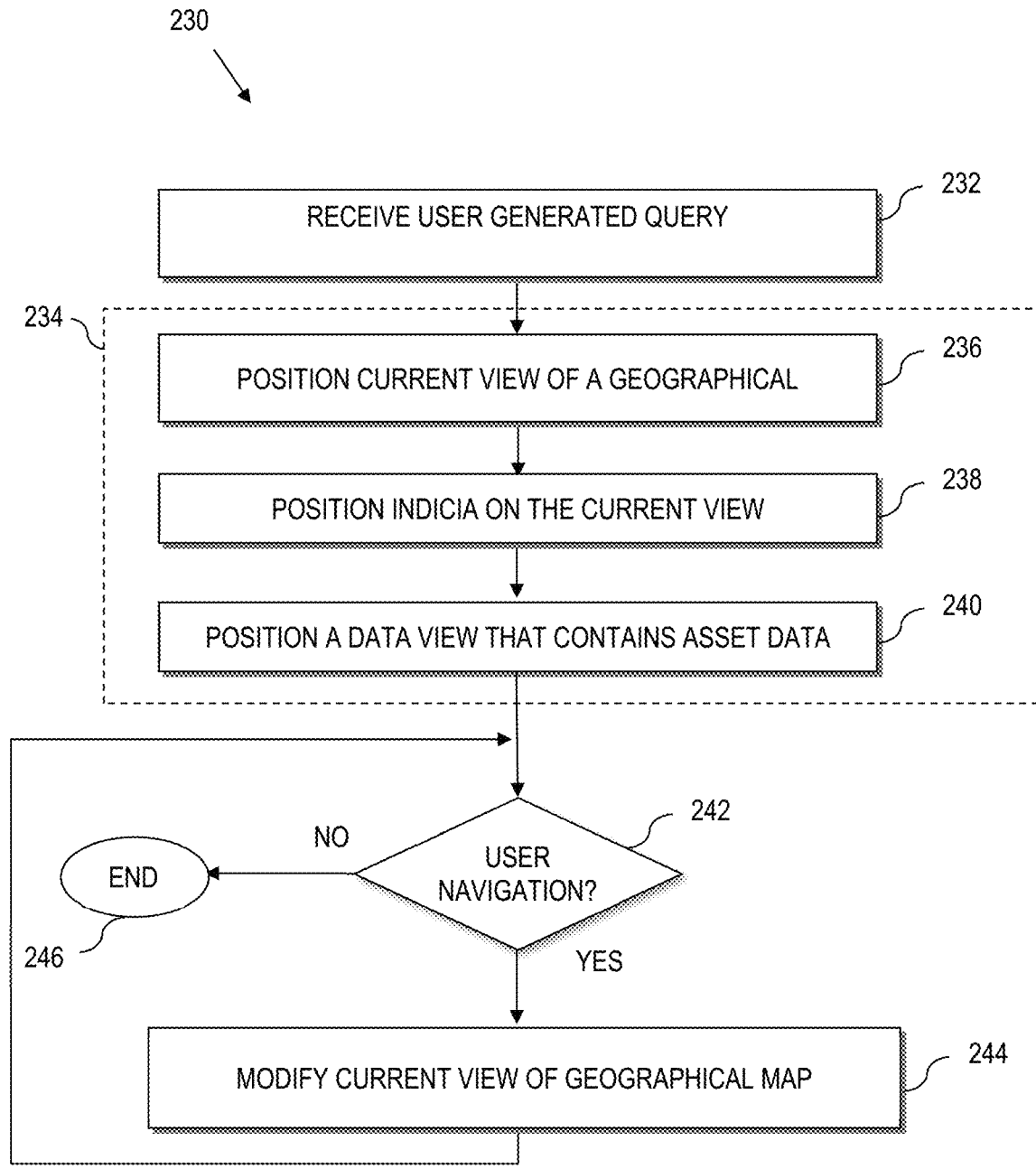
FIG. 2B is a flow chart illustrating a computer-implemented process for querying and viewing assets, according to further aspects of the present disclosure.

Referring to FIG. 2B, a process 230 for visualizing and querying assets is illustrated according to aspects of the present disclosure. With brief reference to FIG. 1, the process 230, or aspects thereof, can be implemented on the platform 118 of the first device 102, on a remote processing device (e.g., the second device 104, third device 106, fourth device 108, fifth device 110, etc.), or a combination thereof. For instance, a web browser operating on a remote processing device, can interact with the platform 118 to obtain web pages necessary to render the query and navigation capabilities, as described more fully herein. The process 230 enables a user to query assets in a portfolio (e.g., a large dataset related to geospatially distributed assets, e.g., buildings, property, other fixed location assets, etc.), and navigate through assets in the portfolio geospatially, and via images. This allows a subjective assessment of data values for purposes of data verification, data validation, and other integrity purposes.

Referring back to FIG. 2B, the process 230 comprises receiving at 232, via a graphical user interface, a user generated query to search a portfolio dataset that is stored in memory. The portfolio dataset comprises assets, where each asset in the portfolio dataset is associated with a geospatial location and at least one policy containing asset data. The process 230 at 232 may also include receiving responsive thereto, a first filtered result comprising assets within the portfolio dataset that satisfy the user generated query.

The process 230 also comprises generating at 234, electronic information for display on a computer display screen responsive to a user navigating the graphical user interface to enter a map view.

The process 230 generates the electronic information at 234 by positioning at 236, a current view of a geographical map on the computer display screen.

The process 230 further generates the electronic information at 234 by positioning at 238, indicia on the current view of the geographical map representing assets within the first filtered result according to their geospatial location that are also geographically located within the current view of the geographical map.

The process 230 yet further generates the electronic information at 234 by positioning at 240, a data view on the computer display screen that contains asset data for assets that are in the current view the geographical map.

Notably, the process 230 is further configured to iteratively perform, responsive to receiving user navigation commands at 242 (YES), modifying at 244 the current view of the geographical map to alter displayed geographical boundaries responsive to a user entered selection. Whereupon, the displayed indicia representing assets is updated according to the modified view of the geographical map, and whereupon the data view is updated to include asset data of assets geographically located within the modified view of the geographical map. The iterative loop returns to 242 to determine whether the user enters additional navigation commands or exits the process (NO). If the user exits the process 230, then the process 230 ends at 246.

For instance, in example embodiments, the process 230 comprises generating for output to the computer display screen, a "filters view" and a "map view", e.g., via a graphical user interface. The filters view includes a visual representation of a set of global filters, where each filter in the set of global filters defines an attribute associated with assets in the portfolio dataset. The map view comprises a visual representation of a geospatially bounded region as a map, as described more fully herein. Here, a user generated query at 232 is received via a graphical user interface by receiving a user entry defining a modified filter value for an attribute of interest within the set of global filters presented in the filters view.

Also, in this configuration, electronic information is generated at 234 for display on the computer display screen by displaying the electronic information in the map view.

The Query

In an example implementation, the process 230 can receive the user generated query at 232 by receiving a command by a processor computer indicating that a user has navigated to and has selected a filters tab menu option on a menu depicted on the computer screen in order to view the filters view. Here, the filters view may be implemented by presenting the set of global filters organized into at least a set of policy attributes, a set of asset attributes, a set of event attributes, or any combination thereof. In some embodiments, presenting the set of global filters organized into a set of policy attributes comprises displaying the set of policy attributes so as to include at least a policy number attribute that stores a policy number linked to an associated asset in the portfolio dataset, and at least one attribute that links the policy number to a geographical region.

In certain embodiments, presenting the set of global filters organized into a set of asset attributes can comprise displaying the set of asset attributes so as to include at least a building construction type, and an exposure rank. As an example, the process 230 can electronically link each building associated with an asset in the portfolio dataset with a fixed geospatial location, and a size of the building.

As a further example, presenting the set of global filters organized into a set of event attributes can comprise displaying the set of event attributes so as to include catastrophe attributes having at least one attribute that corresponds to a risk of damage to the asset.

Yet further, in some embodiments, the process 230 further comprising processing the portfolio dataset based upon a current state of the global filters, including the modified filter value for the attribute of interest, thus returning a subset of the portfolio dataset comprised of assets within the portfolio dataset that satisfy the current state of the global filter values.

In other embodiments, the process 230 may implement receiving a user generated query at 232 by generating for output to a computer display screen, a graphical user interface having a "filters view" and a "map view". Here, the filters view may comprise a visual representation of a set of global filters, and the map view may comprise a visual representation of a geospatially bounded region as a map. Under this particular configuration, the process further comprises receiving via the filters view of the graphical user interface, a user entry defining a modified filter value for an attribute of interest within the set of global filters. As an example, the process 230 can comprise receiving via the filters view of the graphical user interface, a user generated query to search a portfolio dataset that is stored in memory.

The process 230 may also comprise executing a query against the portfolio dataset that is stored in memory based upon the user entry, and receiving responsive thereto, a first filtered result comprising assets within the portfolio dataset that satisfy the query. As with other embodiments discussed herein, the portfolio dataset comprises assets, where each asset in the portfolio dataset is associated with a geospatial location and at least one policy containing asset data.

Figure 3:
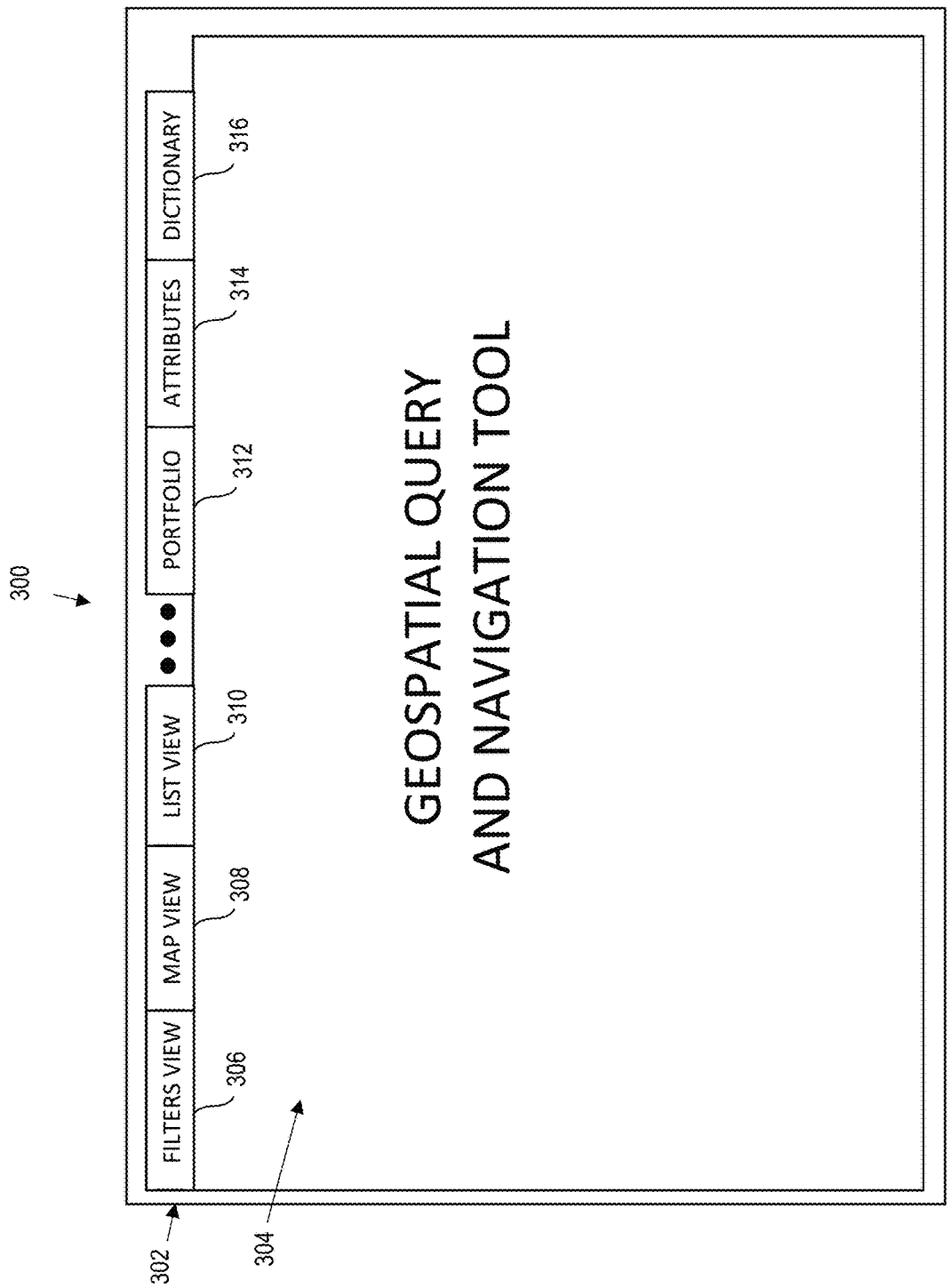
FIG. 3 is an illustration of an example geospatial query and navigation tool splash screen, according to aspects herein.

Examples of filters and querying is discussed herein in greater detail with reference to FIG. 3.

Map View

While in the map view, some embodiments of the process 230 comprise enabling the user to zoom the geographical map down to a single asset. Moreover, the process 230 may further comprise generating for each view of the geographical map, based upon user-selection, a visual depiction of the geographical map as a base map, a photographic image layer, or a combination thereof.

Notably, the map view uniquely enables a user to quickly evaluate parameters of interest based upon proximity to other assets. For example, in the context of an insurance underwriting application, the map view enables quick analysis of locations of risk in proximity to other properties.

Yet further, the process 230 may further comprise color coding the indicia positioned on the current view of the geographical map, e.g., based upon a user-selected ranking. In an example embodiment, each positioned indicia may be color coded according to a rank assessed to each positioned indicia, where the rank may be based, for instance, upon at least one asset data value.

As noted herein, the process 230 can comprise modifying the current view of the geographical map to alter displayed geographical boundaries responsive to a user entered selection. Here, the displayed indicia representing assets is updated according to the modified view of the geographical map, and the data view is updated to include asset data of assets geographically located within the modified view of the geographical map. In this regard, the process 230 may further comprise modifying the current view of the geographical map to alter displayed geographical boundaries by graphically displaying a map showing at least a portion of the United States of America. Here, the process 230 also comprises receiving the user entered selection as an input of a zoom level that enables zooming down to a single asset, wherein the zoom level is selected using an input device interacting with the graphical user interface. The input can be a touch gesture directly applied to the map via a touch screen, the input can be to a slide bar on the graphical user interface, a text-entered zoom value, a circled region or otherwise graphically selected region on the map view (e.g., including a free form selection), etc.

In some embodiments, the process 230 further comprises color coding each displayed indicia based upon a select filter within the set of global filters, where the select filter ranks the displayed indicia based upon a predetermined ranking algorithm. For instance, where the rank is an exposure rank, the process 230 may comprise associating for each asset, an indicium where the associated indicium is related to the exposure rank comprises associating a color to each asset based upon the corresponding exposure rank.

In some embodiments, positioning a current view of a geographical map on the computer display screen comprises displaying an image satellite view. The image satellite view may comprise a navigable street view that allows the user to virtually maneuver about the asset to inspect the asset via images.

Notably, any combination of features set out herein with regard to the process 230 may be combined in any order and/or combination to implement a geospatial visualization and query process in practical applications.

Data View

As noted at 240, the electronic information may be further generated by positioning a data view on the computer display screen that contains asset data for assets that are in the current view the geographical map. Here, the displayed asset data can include at least one field utilized to generate the associated rank for each displayed asset.

Query and Geospatial Navigation Process

Figure 2C:
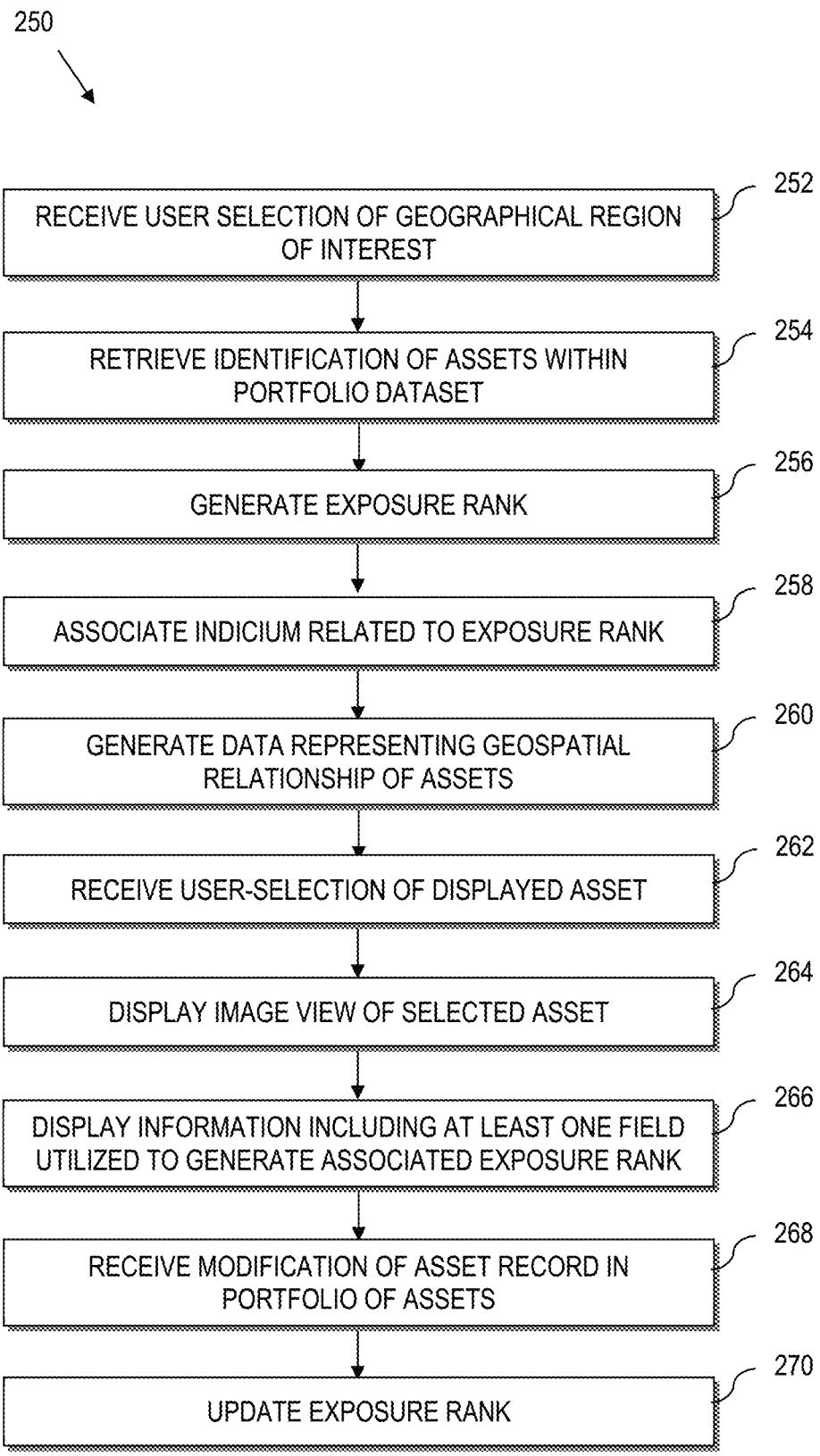
FIG. 2C is a flow chart illustrating a computer-implemented process for a query tool that enables datasets to be linked with geospatial data and geospatially linked image data, according to aspects of the present disclosure.

Referring now to FIG. 2C, a computer-implemented geospatial query and navigation process 250 is illustrated, according to yet further aspects herein. With brief reference to FIG. 1, the process, or aspects thereof, can be implemented on the platform 118 of the first device 102, on a remote processing device (e.g., the second device 104, third device 106, fourth device 108, fifth device 110, etc.), or a combination thereof. For instance, a web browser operating on a remote processing device, can interact with the platform 118, to obtain web pages necessary to render the geospatial query and navigation tool, as described more fully herein. The tool enables a user to query assets in a portfolio (e.g., a large dataset related to geospatially distributed assets, e.g., buildings, property, other fixed location assets, etc.), and navigate through assets in the portfolio geospatially, and via images. This allows a subjective assessment of data values for purposes of data verification, data validation, and other integrity purposes.

Referring back to FIG. 2C, the geospatial query and navigation process 250 comprises receiving, at 252, a user selection of a geographical region of interest. This can be carried out by graphically navigating maps or other geospatial views, entering query terms, selecting pre-configured region(s) using interface tools such as drop-down boxes, etc.

In example embodiments, receiving, at 252, a user selection of a geographical region of interest comprises graphically displaying a map showing at least a portion of the United States of America, and receiving a user selected input of a region displayed with in the map, e.g., a state displayed in the map. The selected region could also be a county, city, town, township, block, or other definable region. The selected region, e.g., a state, etc., can be selected using an input device, e.g., a mouse, pointer, touch on a touchscreen, etc.

In some embodiments, the process 250 can also optionally comprise applying a filter to limit displayed data. Here, filtering can operate interactively with user navigation of a geographical region of interest, to dynamically alter the identified assets. For instance, before, during, or after selecting a geographical region of interest, the user can select further filtering parameters. In this regard, the process 250 can apply a filter to limit the displayed assets in the list of assets to those assets that satisfy filter requirements. In an example implementation, the filter requirements can be defined by policy attributes, asset attributes, event attributes, or any combination thereof.

The process 250 also comprises retrieving, at 254, an identification of assets within a portfolio dataset. In an example implementation, each identification is associated with a fixed, geospatially identifiable location within the selected geographical region of interest. Moreover, each identified asset is associated with a policy characterizing a policy limit. By way of example, assets can comprise a portfolio of buildings, properties, other fixed location structures, etc. The portfolio of assets can also comprise entities, companies, owners, occupiers, or other definable categories that can be designated by geospatially fixed locations. In practical applications, such assets are distributed across a vast geographical area, e.g., across the United States, across one or more states, counties, cities, towns, etc.

The process 250 further comprises generating, at 256, for each retrieved identification of an asset that satisfies at least one precondition, an exposure rank that estimates a likelihood that the corresponding asset is underinsured based at least in part, upon the policy limit. For instance, the exposure rank can be computed by an algorithm that computes a likelihood that a value (e.g., insured value) deviates from an expected, desired, or otherwise appropriate value, e.g., a fully insured value for the asset.

In example embodiments, generating, at 256, an exposure rank can comprise obtaining an insured value of the corresponding asset, and computing a measure of a policy limit to insured value. In this example, obtaining an insured value of the corresponding asset can comprise estimating a property value of the asset. Moreover, in some embodiments, estimating a property value of the asset can comprise normalizing the property value to a price per square foot.

In yet other example embodiments, generating an exposure rank can be carried out by determining an insured value per square foot (sq. ft.), as a limit of insurance divided by applicable co-insurance then divided by sq. ft. The result is an insured amount per sq. ft. Assets in the portfolio database can thus be sorted by the resulting insured amount per sq. ft., and the sorted assets can be grouped or otherwise classified into ranks, e.g., ranked 1-5 or some other measure. Notably, in some embodiments, there is no requirement that the exposure rank is based upon an assessment of the actual value of the asset.

Moreover, in some embodiments, generating an exposure rank at 256, comprises establishing a first precondition as a policy having a policy limit greater than or equal to a predetermined value, and a second precondition as an insured value below a predetermined threshold. Solely by way of example, establishing the first precondition may comprise a policy having a building limit greater than or equal to 100,000, and establishing the second precondition may comprise a building value greater than $350 per square feet.

Further, in some embodiments, generating at 256, an exposure rank that estimates a likelihood can comprise assigning, to each retrieved asset that satisfies the at least one precondition, a rank. By way of example, assigning a rank can comprise assigning a rank on a scale that includes up to five groups.

The process 250 still further comprises associating, at 258, for each retrieved identification of an asset, an indicium where the associated indicium is related to the exposure rank. As an example, associating at 258, for each asset, an indicium can comprise associating a color to each asset based upon the corresponding exposure rank.

The process 250 yet additionally comprises generating, at 260, for display in a graphical user interface, data representing a geospatial relationship of the assets, where each asset is distinguished based upon the associated indicium.

Moreover, the process 250 comprises receiving, at 262, a user-selection of a displayed asset by detecting that the user has selected the indicium of the associated asset.

Also, the process 250 comprises displaying, at 264, an image view of the selected asset. For instance, displaying an image view of the selected asset can comprise querying, based upon the geospatial location of the asset, a satellite view of the asset from a third-party data provider. In some embodiments, the satellite view is a navigable satellite view that allows the user to virtually maneuver about the asset to inspect the asset (and optionally, surrounding areas) via images.

Additionally, the process 250 comprises displaying, at 266, within the graphical user interface, a set of fields of information that characterize the asset, where the displayed set of fields include at least one field utilized to generate the associated exposure rank.

The process 250 also comprises receiving, at 268, a modification of a modifiable field for at least one identified asset portfolio dataset, where the modifiable field affects the computation of the exposure rank for that asset.

Also, the process 250 comprises updating, at 270, the exposure rank for at least the identified asset of the assets in the list of assets. Further, the indicium may be updated as well.

By enabling the ability to link portfolio assets with a combination of geospatial data, as well as geospatially linked image data, a means is provided for image-based subjective assessment of data values associated with select fields in a dataset, e.g., for data validation, verification, adjustment, etc. Moreover, geo-spatial navigation of records provides an exceptionally faster and more informative way to sort data than previously available. This ability is heightened with the addition of addition of filtering of parameters that limit the data in the geospatial views to more quickly visualize data records that need attention.

As a non-limiting but illustrative example, assume that the exposure rank represents an "insured to value" (ITV) ranking, e.g., for business owner policies, commercial policies, or any policy that insures a value of a geospatially definable asset. In this regard, multiple modalities can be combined in a single view, e.g., both business owner policies and commercial policies can be aggregated. To compute the ITV ranking, an algorithm first segregates data by building limits. In this example, preconditions filter to include only records that have both 100,000 or greater in value, and a price per square foot that falls below a preterminal maximum, e.g., $350 per square foot. This filtering is by way of example only and is provided to remove outliers that skew the ranking. For instance, if a price per square foot is $350 or greater, there may be a special reason that requires considerations above the current data validation and verification operation that is being performed. Note that a user may want to visually see all assets, even those that qualify as outliers. As such, the algorithm can hold the filtered outliers out of the ranking computation, but bring those outlier records back in (e.g., via merge, union, etc.) for visually displaying the assets in the geospatial navigation views.

Ranking can then be carried out on the filtered data. As an example, ranking can be carried out using the PROC RANK statement in SAS. Here, the filtered data can be sorted, e.g., based upon a construction field or other ranking. For instance, by sorting by construction per state, like assets are considered together in determining the likelihood that the insured value deviates from an expected fully insured value. For instance, to obtain a ranking in up to five groups of granularity, pseudocode that exemplifies appropriate logic may comprise: proc sort data=work.filtered out=work.filterdv2 by Construction Program a_state (an initial sort to ensure the data is grouped by state), followed by proc rank data=work.filterdv2 groups=5 descending out=work.filterdv2 by Construction Program a_state var PERSQFT ranks ITV_Rank. This effectively uses a data field, e.g., price per square foot (PERSQFT).

Whereas the above example is provided in the context of "insured to value" (ITV) ranking, other ranking algorithms can be utilized to rank data that is displayed in a map view, data view, or both.

Geospatial Navigation and Query Tool Graphical User Interface

In the context of an insurance portfolio tool, aspects herein enable portfolios to be queried and assets to be viewed geospatially, e.g., to view and analyze assets of interest in the portfolio. Thus, as an example, a user can query and view specific property exposures for underwriting evaluation, such as for the viewing of a specified population of risks that are not otherwise identifiable or easily discernable. For example, a unique ability is provided to visualize the location of properties that are characterized as having risk in proximity to other properties, e.g., which may also have risk, may expressly not have risk, etc.

In a specific example implementation of aspects herein, a geospatial navigation and query tool acts as a repository of unique asset (e.g., property, structure, etc.) data to facilitate quantitative and qualitative evaluation. The geospatial navigation and query tool provides a unique ability to query and view a user-selected asset (e.g., a location) for a defined task (e.g., underwriting evaluation). Thus, select assets in a carrier's portfolio can be viewed at both a geospatial and individual image level (e.g., street location level). Moreover, in addition to geospatial and image level views, the tool provides a carrier with both detailed and aggregated data concerning a managed portfolio to better analyze, manage, and underwrite assets within the portfolio.

Referring to FIG. 3, a graphical user interface 300 is illustrated. The graphical user interface 300 can be displayed on a remote client, e.g., one or more of the remote processing devices disclosed in FIG. 1 (e.g., any one of the second device 104, third device 106, fourth device 108, fifth device 110, etc.) For instance, in practical applications, a client processing device runs a web browser that accesses the Internet (e.g., via network 112—FIG. 1), and navigates to a website, e.g., via suitable uniform resource locator (URL), to exchange data with a cloud-based system (e.g., server 102 executing platform 118—FIG. 1). Moreover, the user interface 300 can be used to implement the process 200 of FIG. 2A, the process 230 of FIG. 2B, the process 250 of FIG. 2C, combinations thereof, etc.

As illustrated, graphical user interface 300 implements a tool that includes a menu section 302 and a work area 304.

In an example implementation, the menu section 302 includes a series of tabbed menu options, each tabbed menu option selecting an associated interface that facilitates user interaction with the tool. The tabbed menu options are displayed by way of illustration and not by way of limitation. However, for sake of illustration, the tabbed menu options include a Filters View 306, a Map View 308, a List View 310, a Portfolio View 312, an Attributes View 315, and a Dictionary View 316.

Figure 4:
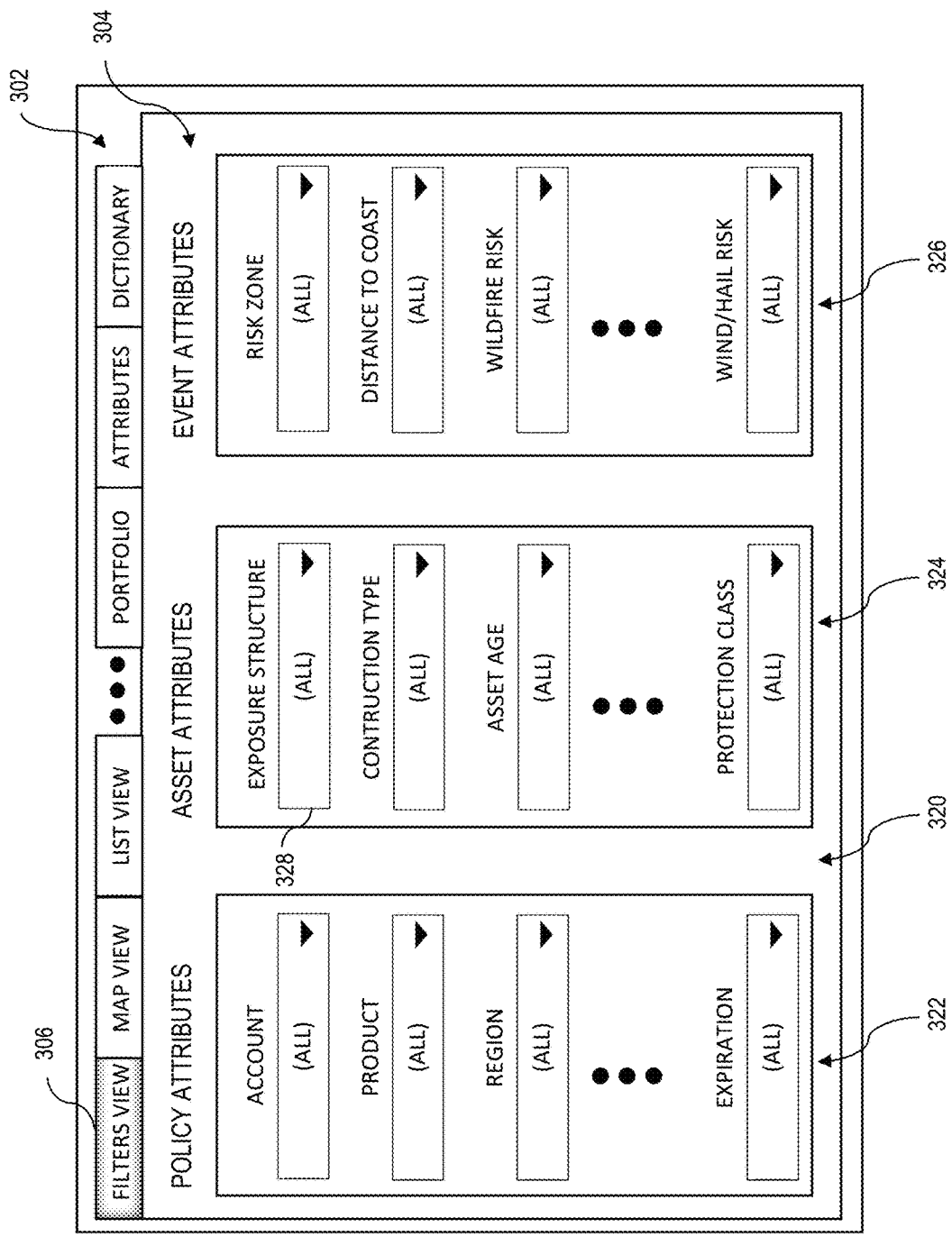
FIG. 4 is an illustration of an example Filters view that allows a user to select global filters, according to aspects of the present disclosure.

Referring to FIG. 4, an example of the work area 302 is illustrated when the Filters View 306 is selected. Interaction with the Filters View 306 can influence interaction with the Map View tab described with reference to FIG. 5.

The Filters View 306 of FIG. 4 allows a user to set a number of pre-configured filters in order to more expediently and more efficiently navigate data stored in a large dataset. For instance, the filters can be defined by the portfolio data 120, attribute data 122, geospatial data 124, image data 126, etc. (FIG. 1). Moreover, in some embodiments, the Filters View 306 can be used to implement prompting 202, receiving 204 and processing 206 (FIG. 2A), receiving the user generated query 232 (FIG. 2B), etc., to otherwise query as described more fully herein, etc.

For sake of illustration, filters are provided in select categories, each category grouping related parameters. Solely for sake of illustration, each category includes several filter option, each filter option with a default value (typically designating the broadest scope possible) and an optional user-input that allows the filter option to be narrowed, e.g., based upon visual input controls, e.g., checkboxes, radio buttons, dropdown lists, list boxes, buttons, toggles, text fields, date fields, sliders, search fields, etc.

For instance, in the context of an insurance underwriting application, categories can include policy attributes 322, asset attributes 324, and event attributes 326.

The policy attributes 322, in an example application, provide global filter attribute options for insurance policy attributes, such as a policy number, entity, product, region, agent, expiration, agency, agency state, or other relevant policy attributes that can serve as global filters to limit data in a corresponding portfolio dataset. Other filter options based upon an underlying policy may be also and/or alternatively be implemented.

The asset attributes 324, in an example application, provide global filter attribute options for assets that are associated with corresponding policies, e.g., a building, property, structure, etc., that is associated with an insurance policy. Example filter options include a location risk score, agreement amount, construction type, location limit, etc. Other filter options based upon an underlying asset may be also and/or alternatively be implemented.

The event attributes 326, in an example application, provide global filter attribute options for events that are relevant to the assets and/or policies in the portfolio data set. Example filter options include a catastrophe risk zone, a distance to a coast or other water source, a wildfire risk, a wind/hail risk, etc. Other filter options based upon an underlying asset may be also and/or alternatively be implemented.

In an example implementation, at least one filter attribute is derived from a rule, program logic, etc., that defines a new type of variable that is unique to the tool. This attribute designates an exposure structure 328 and represents a structure that groups risk by a likelihood of satisfying a predetermined condition.

In an example implementation of underwriting evaluation, the Filters View 306 visually depicts a set of global filters organized into at least a set of policy attributes and a set of asset attributes. The set of policy attributes comprises a policy number attribute that stores a policy number linked to an associated asset in the portfolio dataset, and at least one attribute that links the policy number to a geographical region (e.g., region attribute, agent state attribute, agency attribute, risk state attribute, etc.). In this example, the assets are buildings (e.g., having a known, fixed geospatial location) and the set of asset attributes comprises attributes that characterizes building attributes, such as construction type, exposure rank, etc. Other building data can include a hazard index, location limit, building age, etc. Additional optional attributes can include catastrophe attributes e.g., risk of damage to the asset such as from wind, hail, wildfire, flood, distance from a coast, etc.

Geospatial Navigation

In practical applications, assets may be distributed across large geographical areas. Moreover, these assets, likely due to location, are exposed to different conditions, including environmental conditions that could affect a condition of the asset.

Figure 5:
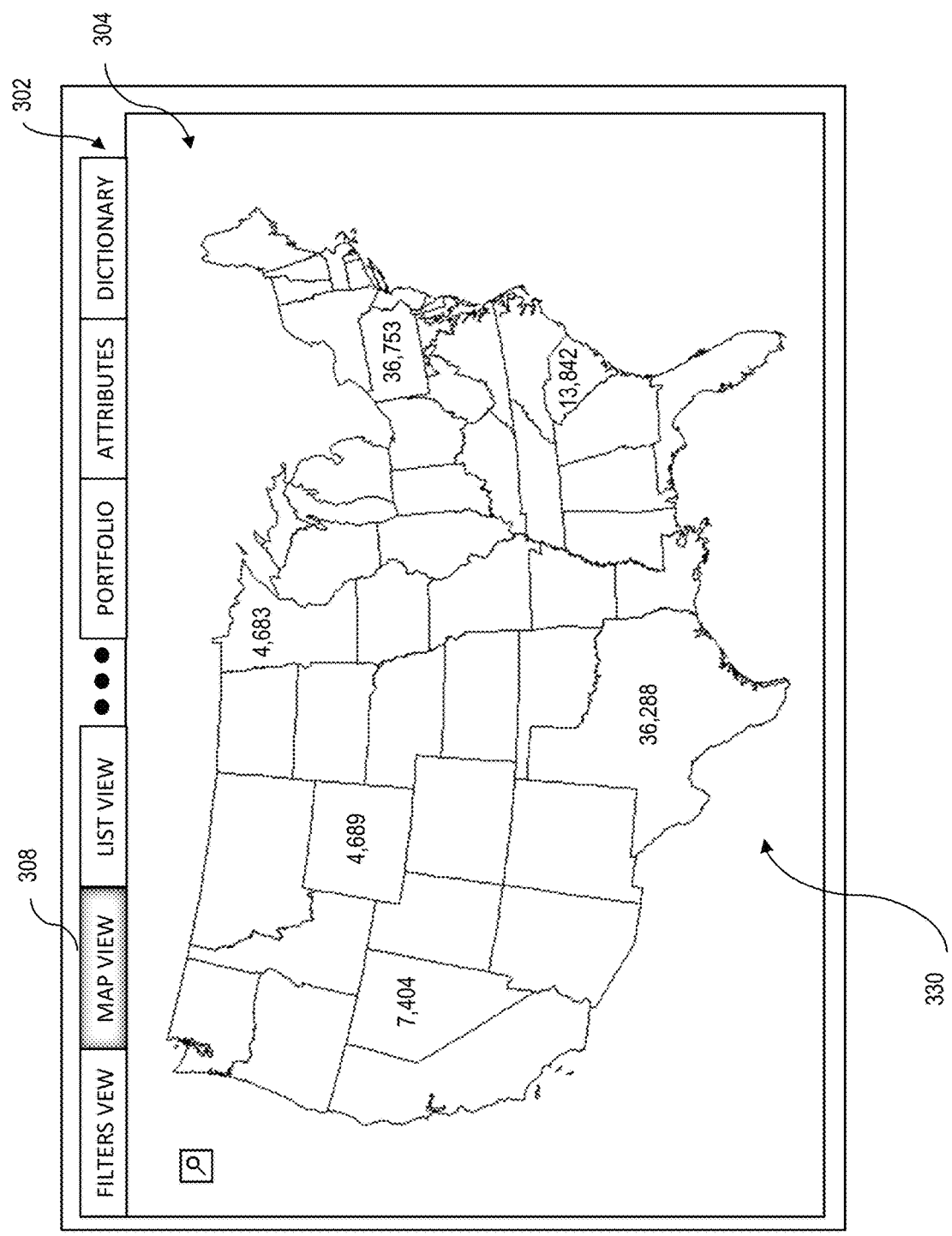
FIG. 5 is an illustration of an example Map view that allows a user geospatially to navigate filtered query results, according to aspects of the present disclosure.

Referring to FIG. 5, an example of the work area 302 is illustrated when the Map View 308 is selected. Interaction with the Map View 308 allows a user to traverse, sort, filter, navigate, zoom, or otherwise interact with asset data in a geospatial context. For instance, when the portfolio database comprises assets such as properties or buildings, such assets have a fixed position. As such, the location of the asset can be visualized geospatially. In the example illustrated, a map of the United States illustrates indicia, e.g., a number of assets located in each state that contains assets. In a view that is zoomed out over a large physical area, the resolution may not allow resolving each asset to a geographically correlated location. However, where geospatial correlation to the map view is not practical, e.g., due to screen resolution, the system can default to a higher layer of granularity, e.g., showing a number of assets in a given location, etc.

As illustrated, a user, e.g., using a touch screen, mouse, or other input device can graphically navigate the map and select a further region to zoom into, e.g., using a magnifying glass, double clicking on a state, using a zoom slider, using a free form selection tool on the map, or using other suitable technique. As noted above, the Filters Tab 306 (FIG. 4) is highly interactive with the Map View 308. If a Filter attribute limited the data in the portfolio dataset to just South Carolina for example, then only assets in that state would be depicted. Moreover, the number of assets that are visually represented are affected by the settings in the Filters Tab.

Figure 6:
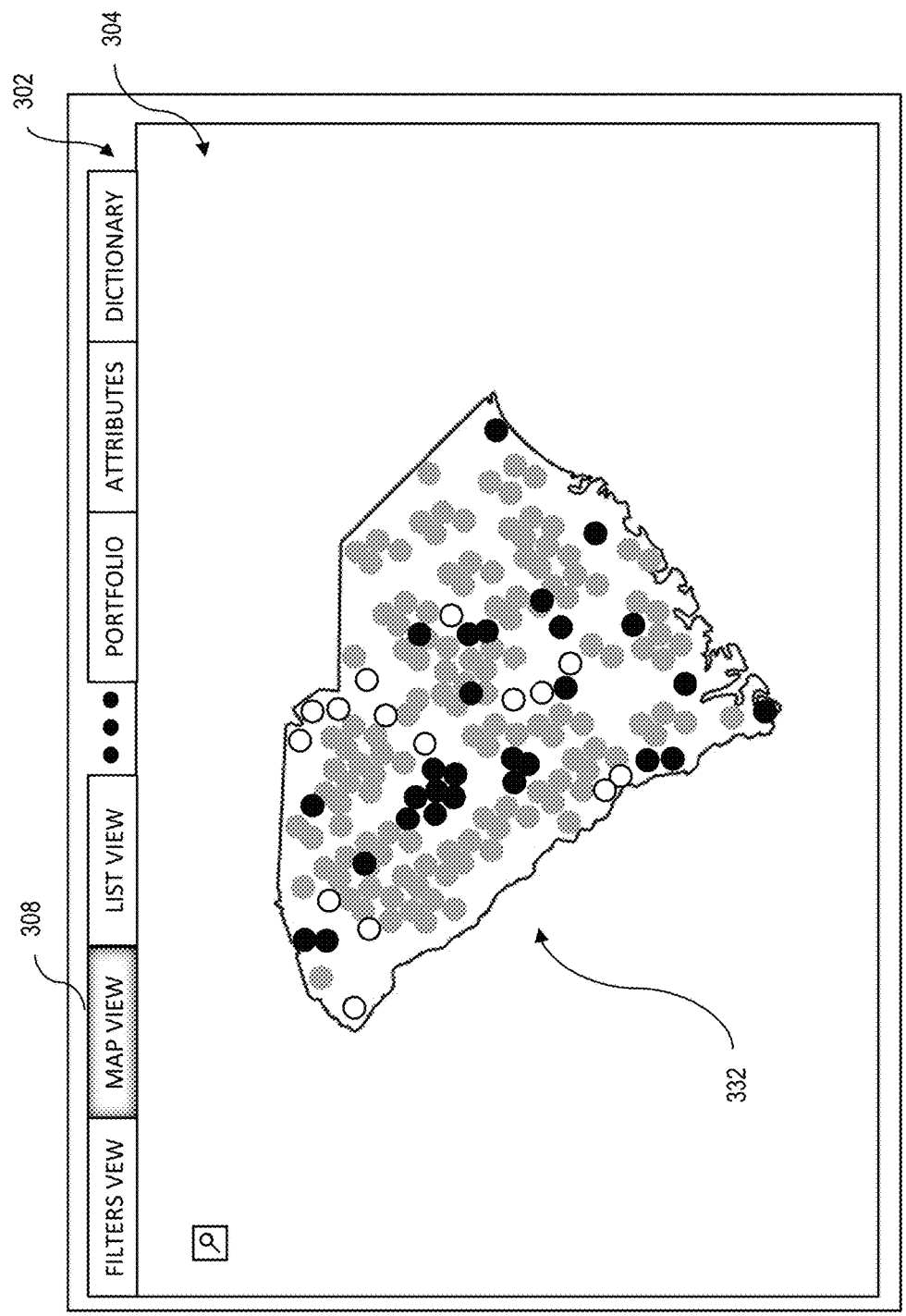
FIG. 6 is an illustration of an example Map view where the user has navigated to a State view of assets, according to aspects of the present disclosure.

Referring to FIG. 6, assume that a user has zoomed into South Carolina. The view in the work area 304 changes to a map of South Carolina, with dots representing the associated geospatial location of the underlying asset. Moreover, the dots can be color coded. In this particular example, the color-coded dots (i.e., indicia) reflect the value of the exposure variable for that asset. For instance, assume that the exposure variable groups a likelihood of the asset being underinsured. Assume further, that each asset is grouped into one of five different groups. Under this configuration, each asset that meets the filter requirements and that is geospatially within the region depicted by the map would be presented in one of five colors, depending upon the computed exposure variable for that asset. This forms a visual depiction that can function as a heat map, allowing a user to quickly see within the bounded region, where the assets are located.

In practical applications, the user can zoom further, into county, city block, street, and other resolution. Once the user finds an asset that is of interest, the user can select an asset, e.g., by selecting the associated dot.

Figure 7:
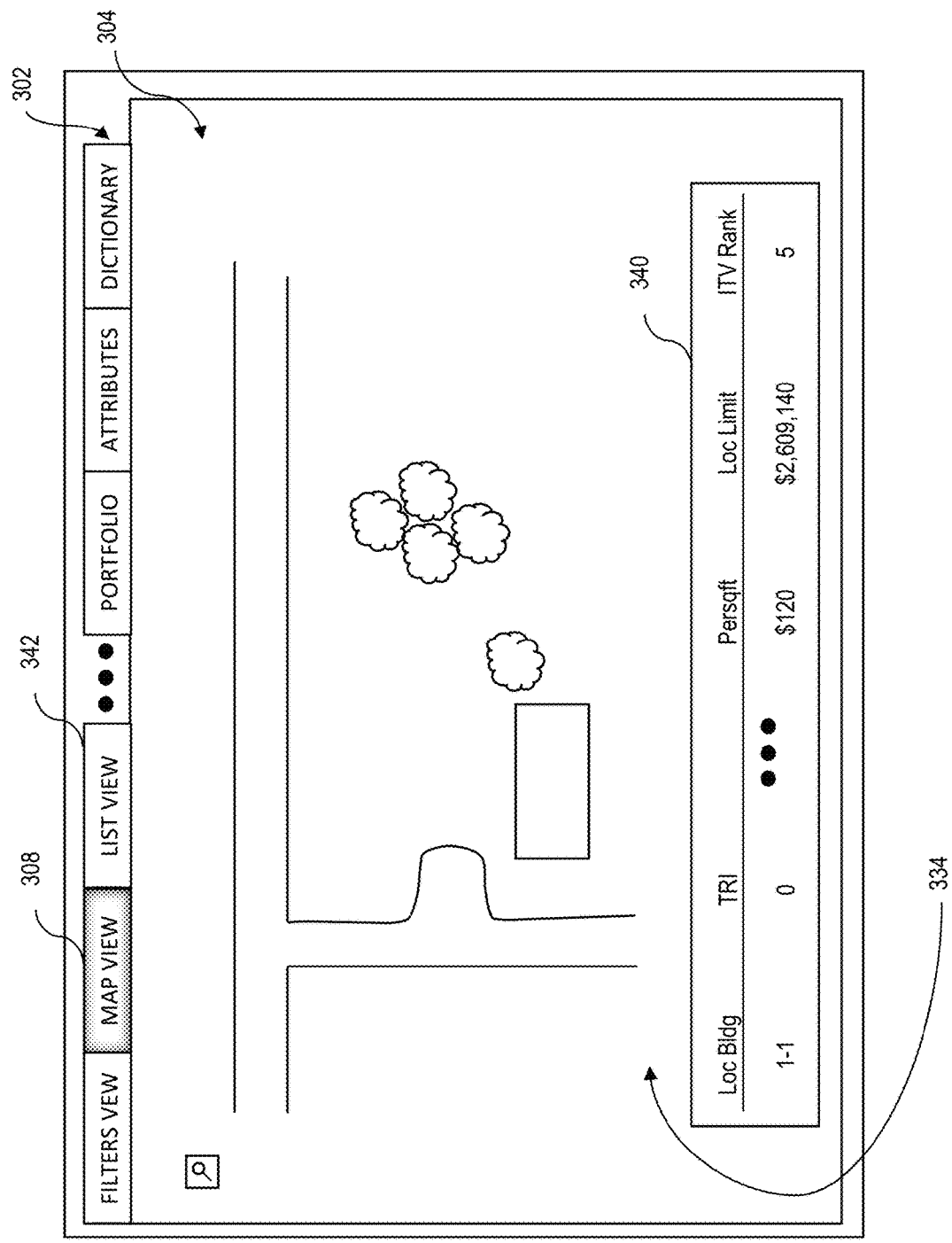
FIG. 7 is an illustration of an example Map view, where the user has zoomed into a geospatially linked image view according to aspects of the present disclosure.

Referring to FIG. 7, upon clicking on a dot, the work area 302 transforms from a geospatial map view to an image view of the asset. However, the image view is geospatially linked. For instance, the image view can be generated by using the geospatial coordinates of the asset to link to an image of the asset. By way of example, A map may be displayed in the work area 302 and may be overlaid on an existing digital map image, such as a satellite view map rendered by Google Maps or Google Earth (both trademarks of Google, Inc.). By navigating the images of the asset, e.g., building, property, etc., a user can establish whether the computed exposure rank is proper for the asset record. For instance, the asset may be in a condition that justifies the exposure ranking. Alternatively, the image may reveal a basis that warrants re-evaluating the asset. For instance, if the asset is a building, and the exposure rank suggests that the building is underinsured, a visual image may reveal property damage that would justify the underinsured value. On the other hand, if the asset appears, based upon the image view, to be truly underinsured, then the user can contact the asset owner to discuss modification of the insured value. If a policy adjustment is made, then when the system recomputes exposure rankings, the asset will be color coded to reflect the updated exposure rank.

FIG. 7 also shows a Data View 340. The data view 340 shows data associated with each asset shown in the map view. Since the example has zoomed into a single asset in the map view, a single entry is provided in the data view 340. However, depending upon the zoom level of the map view (which can be discrete, continuous, or stepped at any desired programmable level), the asset data displayed in the data view 340 will correspond with the assets shown in the map view. The assets can also be viewed in the List View tab 342 in some embodiments.

Thus, based upon user-selection, a visual depiction of the geographical map may be presented as a base map, a photographic image layer, or a combination thereof. The base map can be a schematic representation, drawing, or other image representing the view. A photographic image layer can be an aerial satellite photography layer, a street view layer, etc. The layer can be overlaid or replace the base map when enabling the user to navigate the geographical map views. Further, the views in the map view can be navigable, e.g., to enable inspection of assets via satellite images, street view images, etc.

Example Computer System

Figure 8:
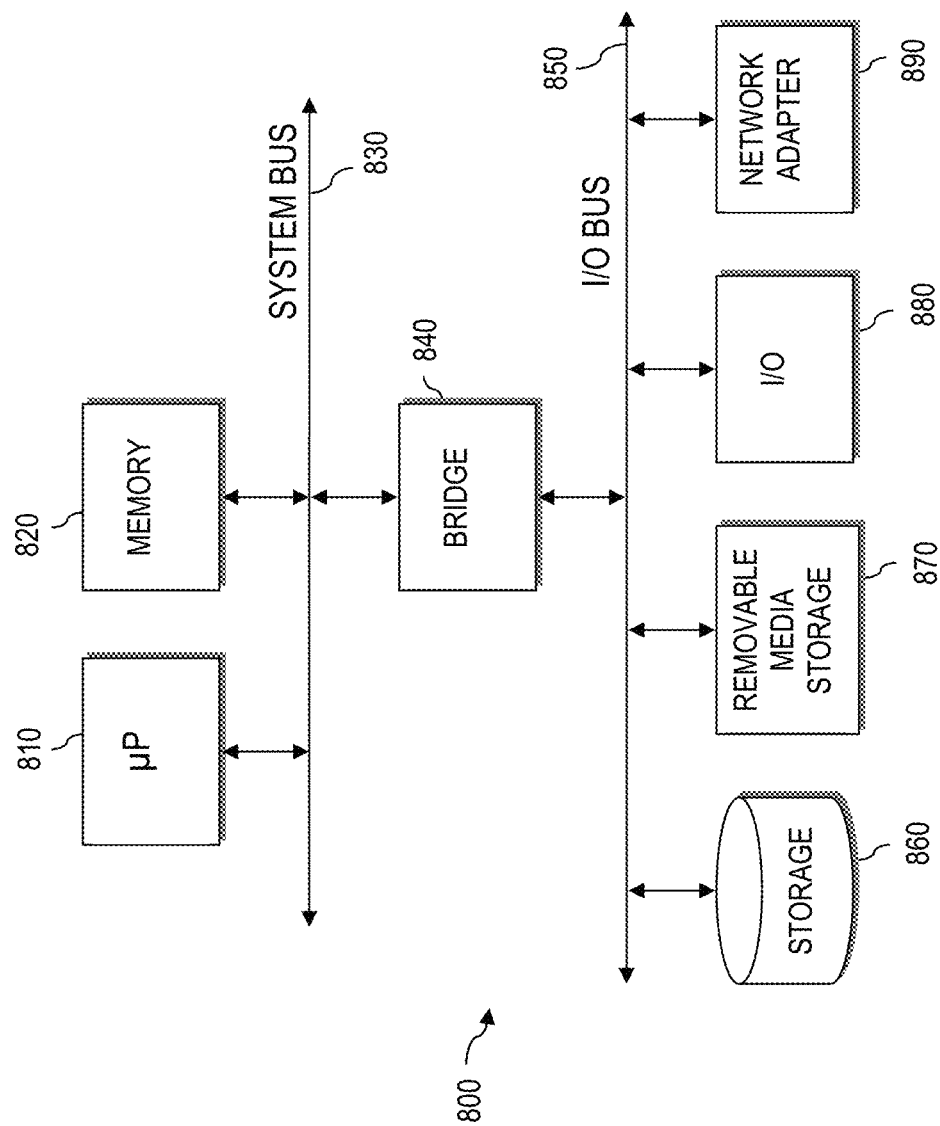
FIG. 8 is a block diagram of a computer system having a computer readable storage medium for implementing functions according to various aspects of the present disclosure as described in greater detail herein.

Referring to FIG. 8, a block diagram of a hardware data processing system is depicted in accordance with the present disclosure. Data processing system 800 may comprise a symmetric multiprocessor (SMP) system or other configuration including a plurality of processors 810 and local memory 820, each connected to system bus 830. Alternatively, a single processor 810 may be employed. An I/O bus bridge 840 interfaces the system bus 820 to an I/O bus 850. The I/O bus 850 is utilized to support one or more buses and corresponding devices, such as storage 860, removable media storage 870, input/output devices 880, network adapters 890, other devices, combinations thereof, etc. For instance, a network adapter 890 can be used to enable the data processing system 800 to communicate with other data processing systems or remote printers or storage devices through intervening private or public networks.

The memory 820, storage 860, removable media storage 870, or combinations thereof can be used to store program code that is executed by the processor(s) 810 to implement any aspect of the present disclosure described and illustrated in the preceding FIGURES.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a device, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A process for visualizing and querying assets, comprising:
generating for output to a computer display screen, a filters view that presents on the computer display screen, a set number of pre-configured filter options for user interaction so as to define a user generated query to search a set of assets based upon user selected filter options;
generating, responsive to receiving the user generated query, a first filtered result comprising assets within the set of assets that satisfy the user generated query, where each asset is associated with asset data including a geospatial location and an exposure rank that estimates a risk associated with the asset based at least in part, upon a policy limit of a policy associated with the asset;
generating electronic information for display on the computer display screen responsive to a user navigating a graphical user interface to enter a map view by:
generating data representing a current view of a geographical map for display on the computer display screen; and
positioning indicia on the current view of the geographical map representing assets within the first filtered result according to their geospatial location that are also located within the current view of the geographical map and that also satisfy a predefined exposure rank requirement; and
wherein the process is further configured to iteratively perform, responsive to receiving user navigation commands:
modifying the current view of the geographical map to alter displayed geographical boundaries responsive to a user entered selection, whereupon:
the displayed indicia representing assets is updated according to the modified view of the geographical map, and whereupon the data view is updated to include asset data of assets geographically located within the modified view of the geographical map.

2. The process of claim 1 further comprising defining the pre-configured filter options by at last one of portfolio data, attribute data, geospatial data, and image data.

3. The process of claim 1 further comprising defining for a select preconfigured filter option, at least one filter attribute that is derived from a rule, wherein the attribute designates an exposure structure and represents a structure that groups risk by a likelihood of satisfying a pre-determined condition, the attribute expressed as the exposure rank.

4. A process for visualizing and querying assets, comprising:
generating for output to a computer display screen, a filters view and a map view, the filters view comprising a visual representation of a set of global filters, each filter in the set of global filters defining an attribute associated with assets in a set of assets associated with a portfolio dataset;
receiving a user generated query to search the set of assets, the user generated query comprising a user entry defining a modified filter value for an attribute of interest within the set of global filters presented in the filters view;
generating, responsive to receiving the user generated query, a first filtered result comprising assets within the set of assets that satisfy the user generated query, where each asset is associated with asset data including a geospatial location and an exposure rank that estimates a risk associated with the asset based at least in part, upon a policy limit of a policy associated with the asset, wherein the user generated query comprises
generating electronic information for display on the computer display screen in the map view, responsive to a user navigating a graphical user interface to enter the map view by:
generating data representing a current view of a geographical map for display on the computer display screen; and
positioning indicia on the current view of the geographical map representing assets within the first filtered result according to their geospatial location that are also located within the current view of the geographical map and that also satisfy a predefined exposure rank requirement; and
wherein:
the process is further configured to iteratively perform, responsive to receiving user navigation commands:
modifying the current view of the geographical map to alter displayed geographical boundaries responsive to a user entered selection, whereupon:
the displayed indicia representing assets is updated according to the modified view of the geographical map, and whereupon the data view is updated to include asset data of assets geographically located within the modified view of the geographical map.

5. The process of claim 4 further comprising:
receiving a command indicating that the user has navigated to and has selected a filters tab menu option on a menu depicted on the computer screen in order to view the filters view.

6. The process of claim 4, wherein generating for output to the computer display screen, the filters view comprising a visual representation of a set of global filters comprises:
presenting the set of global filters organized into at least a set of policy attributes, a set of asset attributes, and a set of event attributes.

7. The process of claim 6, wherein presenting the set of global filters organized into a set of policy attributes comprises displaying the set of policy attributes so as to include at least a policy number attribute that stores a policy number linked to an associated asset in the portfolio dataset, and at least one attribute that links the policy number to a geographical region.

8. The process of claim 6, wherein presenting the set of global filters organized into the set of asset attributes comprises displaying the set of asset attributes so as to include at least a building construction type, and the exposure rank;
further comprising electronically linking each building associated with an asset in the portfolio dataset with a fixed geospatial location, and a size of the building.

9. The process of claim 6, wherein presenting the set of global filters organized into the set of event attributes comprises displaying the set of event attributes so as to include catastrophe attributes having at least one attribute that corresponds to a risk of damage to the asset.

10. The process of claim 4 further comprising processing the portfolio dataset based upon a current state of the global filters, including the modified filter value for the attribute of interest, thus returning a subset of the portfolio dataset comprised of assets within the portfolio dataset that satisfy the current state of the global filter values.

11. A process for visualizing and querying assets, comprising:
generating, responsive to receiving a user generated query to search a set of assets, a first filtered result comprising assets within the set of assets that satisfy the user generated query, where each asset is associated with asset data including a geospatial location and an exposure rank that estimates a risk associated with the asset based at least in part, upon a policy limit of a policy associated with the asset;
generating electronic information for display on a computer display screen responsive to a user navigating a graphical user interface to enter a map view by:
generating data representing a current view of a geographical map for display on the computer display screen;
positioning indicia on the current view of the geographical map representing assets within the first filtered result according to their geospatial location that are also located within the current view of the geographical map and that also satisfy a predefined exposure rank requirement;
enabling the user to zoom the geographical map down to a single asset, and
generating for each view of the geographical map, based upon user-selection, a visual depiction of the geographical map as a base map, a photographic image layer, or a combination thereof;
wherein the process is further configured to iteratively perform, responsive to receiving user navigation commands:
modifying the current view of the geographical map to alter displayed geographical boundaries responsive to a user entered selection, whereupon:
the displayed indicia representing assets is updated according to the modified view of the geographical map, and whereupon the data view is updated to include asset data of assets geographically located within the modified view of the geographical map.

12. A process for visualizing and querying assets, comprising:
generating, responsive to receiving a user generated query to search a set of assets, a first filtered result comprising assets within the set of assets that satisfy the user generated query, where each asset is associated with asset data including a geospatial location and an exposure rank that estimates a risk associated with the asset based at least in part, upon a policy limit of a policy associated with the asset;

generating electronic information for display on a computer display screen responsive to a user navigating a graphical user interface to enter a map view by:

generating data representing a current view of a geographical map for display on the computer display screen; and positioning indicia on the current view of the geographical map representing assets within the first filtered result according to their geospatial location that are also located within the current view of the geographical map and that also satisfy a predefined exposure rank requirement; and color coding the indicia positioned on the current view of the geographical map based upon a user-selected ranking;

wherein the process is further configured to iteratively perform, responsive to receiving user navigation commands:

modifying the current view of the geographical map to alter displayed geographical boundaries responsive to a user entered selection, whereupon:

the displayed indicia representing assets is updated according to the modified view of the geographical map, and whereupon the data view is updated to include asset data of assets geographically located within the modified view of the geographical map.

13. A process for visualizing and querying assets, comprising:

generating for output to a computer display screen, a graphical user interface having a filters view and a map view, the filters view comprising a visual representation of a set of filters, and the map view comprising a visual representation of a geospatially bounded region as a map;

receiving via the filters view of the graphical user interface, a user entry defining a modified filter value for an attribute of interest within the set of global filters;

executing a query against a set of assets based upon the user entry to generate a first filtered result of assets, where each asset is associated with a geospatial location and a policy;

generating, for each asset of the first filtered result of assets, an exposure rank that estimates a risk associated with the asset based at least in part, upon a policy limit of the policy associated with the asset;

generating electronic information for display in the map view by:

positioning a current view of a geographical map on the computer display screen; and positioning indicia on the current view of the geographical map representing assets within the first filtered result according to their geospatial location that are also located within the current view of the geographical map and that also satisfy a predefined exposure rank requirement.

14. The process of claim 13 further comprising:

receiving a command indicating that a user has navigated to and has updated a user entry defining a further modified filter value for at least one attribute of interest within the set of global filters; and re-executing the query against the set of assets based upon the modified user entry to generate a new filtered result of assets, where each asset is associated with a geospatial location and a policy.

15. The process of claim 14, wherein generating for output to the computer display screen, the filters view, comprises:

presenting the set of global filters organized into at least a set of policy attributes, a set of asset attributes, and a set of event attributes.

16. The process of claim 15, wherein presenting the set of global filters organized into a set of policy attributes comprises at least one of:

displaying the set of policy attributes so as to include at least a policy number attribute that stores a policy number linked to an associated asset in the portfolio dataset, and at least one attribute that links the policy number to a geographical region; and displaying the set of event attributes so as to include catastrophe attributes having at least one attribute that corresponds to a risk of damage to the asset.

17. The process of claim 15, wherein presenting the set of global filters organized into a set of asset attributes comprises displaying the set of asset attributes so as to include at least a building construction type, and the exposure rank;

further comprising electronically linking each building associated with an asset in the portfolio dataset with a fixed geospatial location, and a size of the building.

18. The process of claim 13 further comprising color coding indicia positioned on the current view of the geographical map based upon a user-selected ranking.

19. A process for visualizing and querying assets, comprising:

generating for output to a computer display screen, a graphical user interface having a filters view and a map view, the filters view comprising a visual representation of a set of filters, and the map view comprising a visual representation of a geospatially bounded region as a map; receiving via the filters view of the graphical user interface, a user entry defining a modified filter value for an attribute of interest within the set of filters;

assigning an exposure rank to each asset in a set of assets, where each assigned exposure rank estimates a likelihood that a value associated with the corresponding asset deviates from an expected value, and each asset in the set of assets is associated with a corresponding geospatial location identifiable in the map view;

generating for output to the computer display screen, a current view of the geospatially bounded region as a user-navigable geographical map in the map view; and performing in an iterative manner:

positioning indicia on the current view of the geographical map representing assets within the set of assets according to their geospatial location that are also located within the current view of the geographical map and that also satisfy a user-established exposure rank condition; and providing an input that allows a user to change the current view by changing the geospatially bounded region of the geographical map.

* * * * *